United States Patent
Rhee et al.

(10) Patent No.: US 10,374,244 B2
(45) Date of Patent: Aug. 6, 2019

(54) FLUORINE-BASED NANOCOMPOSITE MEMBRANE COMPRISING POLYHEDRAL OLIGOMERIC SILSESQUIOXANES HAVING PROTON DONOR AND PROTON ACCEPTOR, AND METHOD FOR MANUFACTURING SAME

(71) Applicant: SOGANG UNIVERSITY RESEARCH FOUNDATION, Seoul (KR)

(72) Inventors: Heewoo Rhee, Seoul (KR); Sangwoo Kim, Seoul (KR); Taeyung Youn, Gwangmyeong-si (KR)

(73) Assignee: SOGANG UNIVERSITY RESEARCH FOUNDATION, Seoul (KR)

( * ) Notice: Subject to any disclaimer, the term of this patent is extended or adjusted under 35 U.S.C. 154(b) by 31 days.

(21) Appl. No.: 15/742,010

(22) PCT Filed: Mar. 15, 2016

(86) PCT No.: PCT/KR2016/002572
§ 371 (c)(1),
(2) Date: Jan. 4, 2018

(87) PCT Pub. No.: WO2017/159889
PCT Pub. Date: Sep. 21, 2017

(65) Prior Publication Data
US 2018/0198147 A1    Jul. 12, 2018

(51) Int. Cl.
| | |
|---|---|
| H01M 8/10 | (2016.01) |
| C08L 27/22 | (2006.01) |
| C08L 83/06 | (2006.01) |
| C08L 83/08 | (2006.01) |
| C08G 77/24 | (2006.01) |
| C08G 77/26 | (2006.01) |
| C08G 77/28 | (2006.01) |
| C08G 77/30 | (2006.01) |
| H01M 8/1004 | (2016.01) |
| H01M 8/1041 | (2016.01) |
| C08J 5/22 | (2006.01) |
| B82Y 40/00 | (2011.01) |
| H01M 8/1011 | (2016.01) |
| C08G 77/385 | (2006.01) |
| C08G 77/392 | (2006.01) |

(52) U.S. Cl.
CPC .......... *H01M 8/1004* (2013.01); *B82Y 40/00* (2013.01); *C08G 77/24* (2013.01); *C08G 77/26* (2013.01); *C08G 77/28* (2013.01); *C08G 77/30* (2013.01); *C08J 5/2237* (2013.01); *C08L 27/22* (2013.01); *C08L 83/06* (2013.01); *C08L 83/08* (2013.01); *H01M 8/1011* (2013.01); *H01M 8/1041* (2013.01); *C08G 77/385* (2013.01); *C08G 77/392* (2013.01); *C08J 2327/12* (2013.01); *C08J 2327/18* (2013.01); *C08J 2483/06* (2013.01); *C08L 2203/20* (2013.01); *H01M 2300/0082* (2013.01); *H01M 2300/0088* (2013.01); *Y02P 70/56* (2015.11)

(58) Field of Classification Search
CPC ...... C08L 83/06; C08L 83/08; C08L 2203/20; H01M 8/1041; H01M 8/1011; H01M 2300/0088; H01M 2300/0082; C08J 5/2237; C08J 2327/12; C08J 2327/18; C08G 77/24; C08G 77/26; C08G 77/28; C08G 77/30; C08G 77/385; C08G 77/312
USPC .......................................................... 521/75
See application file for complete search history.

(56) References Cited

U.S. PATENT DOCUMENTS

2013/0001153 A1* 1/2013 Na ....................... B01D 69/125
                                                        210/488

FOREIGN PATENT DOCUMENTS

| KR | 10-0804195 B1 | 2/2008 |
| KR | 10-2013-0118075 A | 10/2013 |
| KR | 10-2014-0142036 A | 12/2014 |
| KR | 10-2016-0110579 A | 9/2016 |

OTHER PUBLICATIONS

Choi et al., "Sulfonated Polysulfone/POSS Nanofiber Composite Membranes for FEM Fuel Cells", Journal of the Electrochemical Society, 2010, vol. 157, No. 6, pp. B914-B919 (Year: 2010).*
Monticelli et al. "New Stereocomplex FLA-based Fibers: Effect of POSS on Polymer Functionalization and Properties", Macromolecules, 2014, vol. 47, No. 14, pp. 4718-4727 (Year: 2014).*

(Continued)

*Primary Examiner* — Michael Bernshteyn
(74) *Attorney, Agent, or Firm* — GW Suh Patent Services (57) ABSTRACT

The present invention relates to a proton conductive nanocomposite membrane comprising a fluorinated proton conductive polymer substance introduced with polyhedral oligomeric silsesquioxane (POSS) having a proton donor and polyhedral oligomeric silsesquioxane (POSS) having a proton acceptor, and a method for preparing the same, in which the addition of the very small size POSS having proton donors and POSS having proton acceptors to the nanocomposite membrane increases ion conductivity due to easy hopping of generated protons (cations) within ion channels, thereby realizing excellent proton conductivity while the nanocomposite membrane shows excellent mechanical strength even though the degree of sulfonation of the membrane is increased.

13 Claims, 2 Drawing Sheets

(56) References Cited

OTHER PUBLICATIONS

Ramirez et al., "Incompletely Condensed Fluoroalkyl Silsesquioxanes and Derivatives: Precursors for Low Surface Energy Materials", Journal of the American Chemical Society, 2011, vol. 133, No. 50, pp. 20084-20087 (Year 2011).*

Monticelli, O. et al., "New Stereocomplex PLA-based Fibers: Effect of POSS on Polymer Functionalization and Properties", 2014, vol. 27, No. 14, pp. 4718-4472.

Ramirez, S. M. et al., "Incompletely Condensed Fluoroalkyl Silsequioxanes and Derivatives: Precursors for Low Surface Energy Materials", Journal of the American Chemical Society, 2011, vol. 133, No. 50, pp. 20084-20087.

* cited by examiner

FLUORINE-BASED NANOCOMPOSITE MEMBRANE COMPRISING POLYHEDRAL OLIGOMERIC SILSESQUIOXANES HAVING PROTON DONOR AND PROTON ACCEPTOR, AND METHOD FOR MANUFACTURING SAME

CROSS-REFERENCE TO PRIOR APPLICATIONS

This application is a National Stage Patent Application of PCT International Patent Application No. PCT/KR2016/002572, filed on Mar. 15, 2016 under 35 U.S.C. § 371, which is hereby incorporated by reference in its entirety.

TECHNICAL FIELD

The present invention relates to a proton conductive nanocomposite membrane comprising a fluorinated proton conductive polymer substance introduced with polyhedral oligomeric silsesquioxane (POSS) having a proton donor and polyhedral oligomeric silsesquioxane (POSS) having a proton acceptor, and a method for preparing the same.

BACKGROUND ART

A fuel cell which draws a lot of attention as an alternative clean energy source is a generation system that converts the energy generated from electrochemical reaction between fuel and oxidant directly into electrical energy. With a rapid acceleration of environmental problems, depletion of energies and commercialization of fuel cell vehicles, various polymeric membranes applicable to high temperature are widely developing.

Fuel cells are generally classified into a solid oxide fuel cell operating at 700° C. or more, a molten carbonate electrolyte fuel cell operating at 500-700° C., a phosphate electrolyte fuel cell operating at about 200° C., and an alkaline electrolyte fuel cell and a polymer electrolyte fuel cell operating at room temperature to about 100° C. Among these fuel cells, a direct methanol fuel cell can be miniaturized since methanol need not be reformed.

Among those fuel cells, a polymer electrolyte fuel cell is environmentally friendly and, moreover, has a high power density and energy conversion efficiency. It is also possible to operate at room temperature, miniaturize and seal a polymer electrolyte fuel cell. Thus, this is widely applicable to no-pollution cars, home generation systems, mobile telecommunication equipment, medical devices, military equipment, aerospace equipment, etc. Consequently, researches are increasingly focused on this fuel cells.

Especially, a proton exchange membrane fuel cell (PEMFC) utilizing hydrogen gas fuel is a power generation system that produces DC electricity from an electrochemical reaction between hydrogen and oxygen, and has a structure where a proton conductive polymer membrane with thickness of 100 μm or less is inserted between an anode and a cathode. Therefore, a hydrogen molecule decomposes to a hydrogen ion and an electron by oxidation reaction at an anode as a reacting gas, hydrogen, is supplied. At this time, a reduction reaction that an oxygen molecule accepts electrons to become oxygen ions is occurred when the hydrogen ion is transferred to the cathode through the proton conductive polymer membrane. The oxygen ion generated reacts with the hydrogen ions transferred from the anode to become a water molecule.

In these procedures, the proton conductive polymer membrane is electrically isolated, but acts as a medium that transfers hydrogen ions from the anode to the cathode during cell operations and simultaneously separates fuel gas or liquids from oxidant gas. Thus, the membrane should have an excellent mechanical property, electrochemical stability and thermal stability at an operating temperature. In addition, it is required that the membrane can be fabricated as a thin film in order to reduce friction and should not expand much when containing liquid.

The conventional electrolytic membrane that has been widely used to polymer electrolyte fuel cells is Nafion developed by Du Pont. However, although the Nafion has a good proton conductivity (0.1 S/cm), it has disadvantages that its mechanical strength is poor such as a low tensile strength of 20 MPa and a water swelling of 40%. The price of the most commercialized fluorinated polymer, the Nafion, is about 100 \$/cm$^2$, whereas that of a typical hydrocarbon polymer is about 6-10 \$/cm$^2$. Thus, Over 10% of the total PEMFC MEA price can be curtailed by substituting Nafion with hydrocarbon polymer. However, since the degree of phase separation between hydrophobic main chain and hydrophilic side chain is lower than that of fluorinated polymer in spite of higher IEC of a hydrocarbon polymer than Nafion, the diameter of a ion cluster of the hydrocarbon polymer is 4-5 nm, which is 50% smaller than that of Nafion. Due to this small ion cluster, the ion conductivity of the hydrocarbon polymer is 0.05 S/cm, which is half of the Nafion having the ion conductivity of 0.1 S/cm. Accordingly, there are researches for improving the ion conductivity of the hydrocarbon polymer so as to be higher ion conductivity than the Nafion. However, although a typical hydrocarbon polymer, sulfonated polyetheretherketone (sPEEK), has a water swelling of below 20% owing to an aromatic main chain having a high stiffness, the water swelling of the sPEEK significantly increases and dissolves into water when the degree of sulfonation exceeds 75%.

The Korean Patent Registration No. 10-804195 discloses a high temperature-type hydrogen ion conductive polymer electrolyte membrane that has a high conductivity at high temperature by introducing a sulfonic group into a inorganic nanoparticle and, then, making a composite material with a polymer electrolyte. However, there is a disadvantage that the proton conductivity of this composite membrane is low since several tens to several hundreds nanometer-sized inorganic particles hinders the proton transport. In addition, the mechanical strength of the composite membrane is lowered owing to the size and aggregation of the inorganic particles.

The Korean Patent Application Publication No. 10-2013-118075 ('Proton-conductive nanocomposite membrane utilizing silsesquioxane having a sulfonic acid group') invented by the present inventors discloses a composite membrane comprising fluorine-based proton conductive polymer, such as Nafion, mixed with silsesquioxane. According to this document, the mechanical strength and conductivity of the electrolyte membrane is enhanced by using several nanometer-sized silsesquioxane and, however, there are still some disadvantages such as high production cost, a decrease of conductivity during long-term use, a rapid decrease in performance above 80° C., etc. In addition, there is still a need for a novel nanocomposite membrane electrolyte which has a higher ion conductivity in order for substitution of expensive Nafion.

SUMMARY OF DISCLOSURE

Technical Problem

The object of the present invention is to provide a proton conductive polymer membrane which exhibits high proton conductivity and no mechanical strength degradation, and prevents gas permeation.

Technical Solution

One aspect of the invention relates to a proton conductive nanocomposite membrane comprising a fluorinated proton conductive polymer substance introduced with polyhedral oligomeric silsesquioxane (POSS) having a proton donor and polyhedral oligomeric silsesquioxane (POSS) having a proton acceptor.

Another aspect of the invention relates to a method of preparing a proton conductive nanocomposite membrane comprising the steps of: mixing polyhedral oligomeric silsesquioxane (POSS) having a proton donor and polyhedral oligomeric silsesquioxane (POSS) having a proton acceptor with a fluorinated proton conductive polymer solution; and casting the mixed solution, followed by removing a solvent.

Yet another aspect of the invention relates to a membrane electrode assembly for a fuel cell comprising a proton conductive nanocomposite membrane.

Advantageous Effects

The nanocomposite membrane of the present invention has POSS having a proton donor as well as POSS having a proton acceptor and, thus, the ion conductivity increases due to easy hopping of protons (cations) produced.

In addition, the POSS employed in the present invention is extremely small and, thus, does not hinder the proton transport within the ion channel of the polymer membrane, thereby achieving an excellent proton conductivity.

The proton conductive nanocomposite membrane of the present invention may be used for a polymer electrolyte membrane or a separation membrane of a direct methanol fuel cell.

DETAILED DESCRIPTION—BEST MODE

The present invention will be described in detail as follows.

The present invention relates to a proton conductive polymer nanocomposite membrane for a fuel cell.

The proton conductive nanocomposite membrane of the present invention is formed by introducing polyhedral oligomeric silsesquioxane (POSS) having a proton donor and polyhedral oligomeric silsesquioxane (POSS) having a proton acceptor to fluorinated proton conductive polymer substrate.

Fluorinated proton conductive polymer may be used for the polymer membrane of the present invention.

The fluorinated proton conductive polymer substance may be a fluorinated polymer comprising a sulfonic acid group at a terminal site.

The fluorinated proton conductive polymer substance may be Nafion, Hyflon, Flemion, Dow, Aquivion, Gore or Aciplex.

According to the present invention, two types of polyhedral oligomeric silsesquioxane (POSS) is used as a filler for fluorinated proton polymer membrane. More particularly, both polyhedral oligomeric silsesquioxane (POSS) having a proton donor and polyhedral oligomeric silsesquioxane (POSS) having a proton acceptor are utilized.

The polyhedral oligomeric silsesquioxane (POSS) having a proton donor may be shown as the following formula 1.

Formula 1

In the formula 1, R is a proton donor.

R is R1R2, and

R1 is is $(CH_2)_n$ (n is an integer of 1-6) or phenylene, and R2 is acetic acid, nitric acid, phosphoric acid, sulfonic acid, perchloric acid, chloric acid, carbonic acid, or a salt thereof, or a mixture thereof.

The polyhedral oligomeric silsesquioxane (POSS) having a proton donor may be sulfonated octaphenyl polyhedral oligomeric silsesquioxane, shown as the following formula 2.

Formula 2

At least one R of the formula 2 is —$SO_3H$.

R of the formula 2 may be functionalized with up to 16 functional groups.

The polyhedral oligomeric silsesquioxane (POSS) having a proton acceptor may be shown as the following formula 3.

Formula 3

In the formula 3, A is a compound comprising nitrogen, oxygen, phosphorene, sulfur, fluorine, chlorine atoms having lone pair electrons.

Alternatively, A is —A1A2, where A1 is $(CH_2)_n$ (n is an integer of 1-6) or phenylene, and A2 is $NH_2$, $NO_3^-$, $NH_3$, $PH_3$, $NH_2^-$, $Cl^-$, $O^{2-}$, $S^{2-}$, $F^-$ or a salt thereof, or a mixture thereof, and The polyhedral oligomeric silsesquioxane (POSS) having a proton acceptor may be shown as the following formula 4.

Formula 4

In the formula 4, at least one A is $NH_2$.

A of the formula 4 may be functionalized with up to 16 functional groups.

The sizes of the polyhedral oligomeric silsesquioxane having a proton donor (hereinafter, referred to as POSS-SA) and the polyhedral oligomeric silsesquioxane having a proton acceptor (hereinafter, referred to as POSS-N) may be 1-5 nm, preferably 1-3 nm, and more preferably 1-2 nm. The size of POSS-SA is so small that ion transport in the ion channel of the nanocomposite membrane is not hindered. Therefore, the most problematic thing, that is, the decrease of the conductivity, may be solved.

The polyhedral oligomeric silsesquioxane (POSS) has a very small size, and a very compact chemical structure where phenyl groups and sulfonic acid groups (or amine groups) are bonded to the silica cage structure and, therefore, is very easily dispersible.

Since the membrane of the present invention includes a proton acceptor acting as a Brønsted base such as amine, the proton acceptor forms a strong hydrogen bonding with excess protons introduced additionally in a nano-channel and the ion conductivity enhances through Grotthuss mechanism via proton hopping.

Since the nanocomposite membrane of the present invention is composited with below 5 wt % of, preferably below 1 wt % of the POSS-N, it does not hinder movement of protons in the channel and lowers the total ion exchanging ability. Besides, the proton acceptor has Grotthuss mechanism via a hydrogen-bonding with a proton source additionally produced by the proton donor.

More specifically, a hopping mechanism (or Grotthuss mechanism) refers to a mechanism that a proton is hopped and conducted through a hydrogen-bonding network. With introduction of a cation acceptor acting as a strong Brønsted base (amine group) within the range of not decreasing an ion exchanging ability, hydrogen-bonding mediators increase and, thus, the hopping distance between a Brønsted acid and base. Consequently, the Grotthuss mechanism much more activates and a proton conductivity may be considerably enhance.

Even though the weight of the polyhedral oligomeric silsesquioxane (POSS) is increased to up to 20 wt %, aggregation within a channel is hindered, an ion conductivity may be significantly enhanced, and mechanical strengths (tensile strength and intensity) may be improved. Since the tensile strength of the nanocomposite membrane of the present invention increases, without loss of ductility, with addition of the polyhedral oligomeric silsesquioxane (POSS), a thin film of a thickness of 30 μm or less may be produced. That is, the nanocomposite membrane of the present invention may be prepared as an ultra-thin film.

The polyhedral oligomeric silsesquioxane (POSS) can increase the mechanical strength of the nanocomposite membrane and, thus, hinders water-swelling of the membrane. In addition, the nanocomposite membrane added with the polyhedral oligomeric silsesquioxane (POSS) may maintain its high ion conductivity at 80° C. or below.

The polyhedral oligomeric silsesquioxane (POSS) may be included by 1-20 wt %, preferably 1-10 wt %, and more preferably 1-2 wt % of the total weight of the proton conductive nanocomposite membrane.

The polyhedral oligomeric silsesquioxane (POSS) having a proton donor and polyhedral oligomeric silsesquioxane (POSS) having a proton acceptor may be contained in the nanocomposite membrane of the invention by a weight ratio of 1:0.05-1, preferably 1:0.05-0.3, more preferably 1:0.1-0.25.

The polyhedral oligomeric silsesquioxane (POSS) having a proton acceptor may be included by 5 wt % or below, preferably 1 wt % or below against the nanocomposite membrane weight.

The polyhedral oligomeric silsesquioxane (POSS) having a proton donor may be included by 1-10 wt % or below, preferably 1-5 wt % or below, more preferably 1-2 wt % against the nanocomposite membrane weight.

In case that the polymer membrane is Nafion membrane and the contents of the polyhedral oligomeric silsesquioxane having a sulfonic acid group and the polyhedral oligomeric silsesquioxane having an amine group are 3 wt % and 0.1 wt %, respectively, the conductivity of the membrane is 0.18 S/cm, higher than that of the currently commercialized Nafion membrane (0.12 S/cm) under the condition of 80° C./100% RH.

The membrane of the present invention employs Nafion membrane. However, the POSS-SA and POSS-N form molecular composite within the polymer membrane and, therefore, the mechanical strength of the membrane is high.

That is, the present invention may allow for improving both the conductivity and the mechanical strength of a proton conductive composite membrane.

Another aspect of the present invention relates to a method for preparing a proton conductive nanocomposite membrane.

The method comprises: mixing polyhedral oligomeric silsesquioxane (POSS) having a proton donor and polyhedral oligomeric silsesquioxane (POSS) having a proton acceptor with a fluorinated proton conductive polymer solution; and casting the mixed solution, followed by removing a solvent.

The polyhedral oligomeric silsesquioxane (POSS) having a proton donor and polyhedral oligomeric silsesquioxane (POSS) having a proton acceptor are describe above in detail.

According to the method of the present invention, the polyhedral oligomeric silsesquioxane (POSS) having a proton donor and polyhedral oligomeric silsesquioxane (POSS) having a proton acceptor may be included by 1-20 wt %, preferably 1-10 wt %, and more preferably 1-5 wt % against the total weight of the proton conductive nanocomposite membrane.

According to the method, the polyhedral oligomeric silsesquioxane (POSS) having a proton donor and polyhedral oligomeric silsesquioxane (POSS) having a proton acceptor may be included by a weight ratio of 1:0.05-1, preferably 1:0.05-0.3, and more preferably 1:0.05-0.3.

Yet another aspect of the present invention relates to a membrane electrode assembly for a fuel cell comprising a fuel electrode; an oxygen electrode; and said proton conductive nanocomposite membrane placed in between an adjoining fuel electrode and an oxygen electrode. Details of a fuel electrode and an oxygen electrode are known in public. The proton conductive nanocomposite membrane serves as a medium that transports protons and electrons generated at a fuel electrode to an oxygen electrode, and as a membrane that separates hydrogen from oxygen.

The proton conductive nanocomposite membrane may be used for the nanocomposite membrane of the present invention described above.

The present invention also relates to a fuel cell comprising the aforementioned membrane electrode assembly.

A fuel cell according to one embodiment of the present invention may be prepared by any known method, using the above-mentioned membrane-electrode assembly. That is, a unit cell may be fabricated by separating both ends of the membrane-electrode assembly via graphite and, then, a fuel cell stack may be produced by stacking the unit cells.

DETAILED DESCRIPTION—MODE FOR INVENTION

The present invention will be described in detail through the following Examples and, however, the invention is not limited by these Examples.

EXAMPLE 1

1. Synthesis of polyhedral oligomeric silsesquioxane having a sulfonic group (POSS-SO3H(POSS-SA))

Octaphenyl POSS
(POSS-Ph)

Chorosulfonic acid
24 hr. RT

OPS

Sulfonated Octaphenyl POSS
(POSS-SA)

First, 1 g of octaphenyl POSS was mixed with 5 mL of chlorosulfonic acid and, then, the solution was stirred overnight at room temperature. The solution was then poured into 200 ml of THF, in which precipitates were filtered. This step was repeated until a neutral pH was reached. Brown-colored solids were obtained as a result of drying under reduced pressure.

H-NMR (D2O)-7.54 (dd; ArHmeta to POSS), 7.81-7.83 (2 dd; ArH para to SO3H, ArHpara to POSS), 8.03 (dd; ArH ortho to SO3H and POSS).

FT-IR: 3070 (OH of SO3H), 2330 (SO3H—H2O), 1718, 1590, 1470, 1446, 1395, 1298, 1132 (SO3 asymm), 1081 (SO3 symm), 1023 (SiOSi asymm), 991, 806 (SiOSi symm)

2. Synthesis of polyhederal oligomeric silsesquioxane having an amine group (POSS-NH2(POSS-N))

-continued

ONPS

OAPS

<Preparation of ONP (Octaphenyl POSS)>

5 g of OPS and 30 mL of fuming nitric acid were added into iced water in a beaker and, then, mixed for about 30 min. The mixture was reacted for 20 hr at room temperature. The thus obtained solution was added into iced water to form powders, followed by filtration. Then, the thus obtained solid residuals were washed with water and, then, washed twice with 100 mL of ethanol (yield of ONP).

<Preparation of OAPS>

5 g of ONP obtained above was mixed and crushed with 0.06 g of 10 wt % Pd/C, and 20 mL of THF and 20 mL of trimethylamine were added. Small amount of formic acid was added to the mixture and reacted for 5 hr. After reaction, two layers were formed. The upper layer was discarded and the lower black layer was collected and, then, 50 mL of THF and 50 mL of water were mixed. The mixed solution was chromatographed with celite to obtain octanitrophenyl POSS (ONPS). Subsequently, 50 mL of ethyl acetate was added to filtrate and, then, 100 mL of pure water was added and shaked.

EA layer (the upper layer) was collected and filtered to obtain brown crystals (products) and, then, 500 mL of hexane was mixed to yield octaaminophenyl POSS (OAPS).

3. Preparation of Nanocomposite Membrane

Nafion solution prepared by DuPont was dried under vacuum and solvent was removed. Then, the dried solution was dissolved in dimethylacetamid (DMAc) by a weight ratio of 1:19 (5 wt % solution). Each 11.76 g of 5 wt % solution was stored in 4 separate vials, respectively.

The concentration of POSS-SA in 0.588 g of Nafion was fixed to 2 wt % and the concentration of POSS-N in Nafion was adjusted to 0-1 wt % and, then, Nafion/POSS-SA/POSS-N nanocomposite membrane was prepared. The POSS-SA and POSS-N prepared above were mixed in the 4 Nafion vials, respectively, and agitated for 1 day.

After agitation, the 0-1 wt % Nafion/POSS-SA/POSS-N solution was added into a Schale, respectively, and then casted in an oven at 100° C. for overnight. After casting, distilled water was added to the Schale and the nanocomposite membrane was carefully stripped off.

COMPARISON EXAMPLE 1

A proton conductive polymer membrane was prepared by using only Nafion without adding POSS-SA.

Experiment: Measurement of Ion Conductivity

Figure 1:
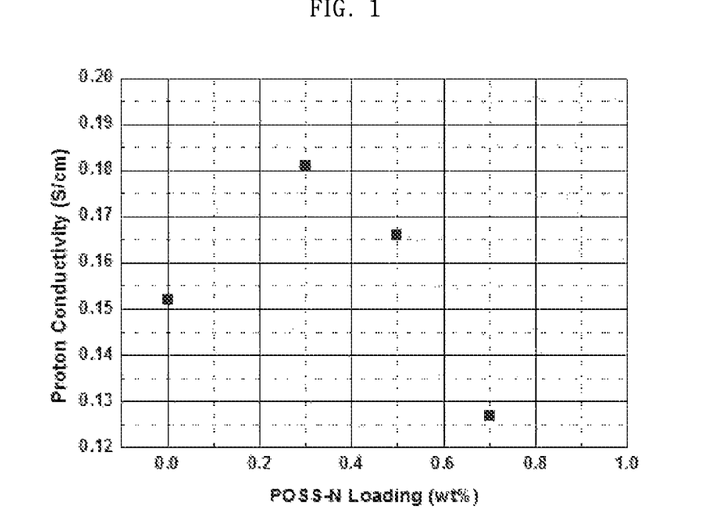
FIG. 1 shows the measurements of the ion conductivity of the conductive nanocomposite membranes prepared in Example 1.

The thicknesses of the composite membranes obtained in Example 1 and Comparison Example 1 were measured. Thereafter, a 4 probe conductivity cell (Bekktech) was connected to an AC impedance bridge and the ion conductivities of said samples were measured at 80° C./100% RH. The ion conductivities measured are shown in FIG. 1.

Experiment 2: Measurement of Tensile Strength

Figure 2:
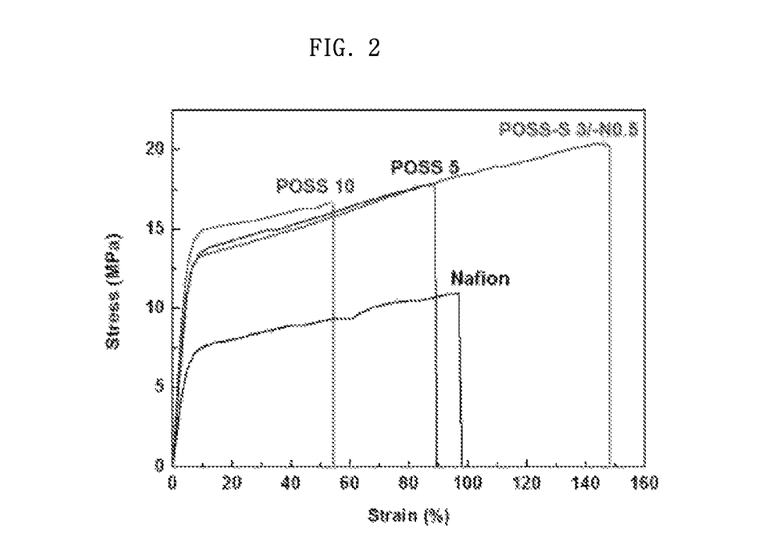
FIG. 2 shows the measurements of the tensile strengths of the conductive nanocomposite membranes prepared in Example 1 and Comparison Example 1.

After drying the membranes of Example 1 and Comparison example 1, the mechanical strengths of the membranes were measured by using a UTM (universal testing machine) at room temperature according to ASTM d882 standard testing procedures. FIG. 2 shows the tensile strengths of the nanocomposite membranes of Example 1 and Comparison example 1.

Experiment 3: Performance Test of Fuel Cells

Both sides of the nanocomposite membrane prepared in Example 1 (2 wt % POSS-SA, 0.3 wt % POSS-N were used) and Comparison Example 1 were coated with commercial catalyst electrode layer by the hot-press method to produce membrane-electrode assemblies (MEAs), respectively.

Single-side ELAT® electrodes which are available from E-TEK Inc. were used for the electrodes for this experiment, where Pt—Ru black catalyst was used for a cathode and Pt black catalyst was employed for an anode. The process conditions of the hot-press method were 140° C., 5 min, and about 60 kg/cm². Silicon-coated gaskets were located above and below the membrane-electrode assembly, respectively, which were then pressed and sealed with current collector plates made by carbon material to obtain unit cells.

When unit cell experiments, stoichiometric ratios of pure inlet hydrogen and oxygen were 2.0 and 3.0, respectively, and the feed gas pressure was 30 psi. The performance of the cells were measured at 80° C. and 100% RH and the results are shown in FIG. 3.

Referring to FIG. 1, when the contents of POSS-SA and POSS-N are 2 wt % and 0-1 wt %, respectively, the ion conductivity had the highest value of 0.182 S/cm at the POSS-N content of 0.3 wt %.

FIG. 2 shows the stress when the contents of POSS-N and POSS-SA were 0.5 wt % and 10 wt %, respectively. With reference to FIG. 2, it is understood that the stress was maintained in the Example despite increase of strain value of 80%-140%. That is, the tensile strength of the nanocomposite membrane of the present invention increases with addition of the polyhedral oligomeric silsesquioxane (POSS) without loss of ductility.

Figure 3:
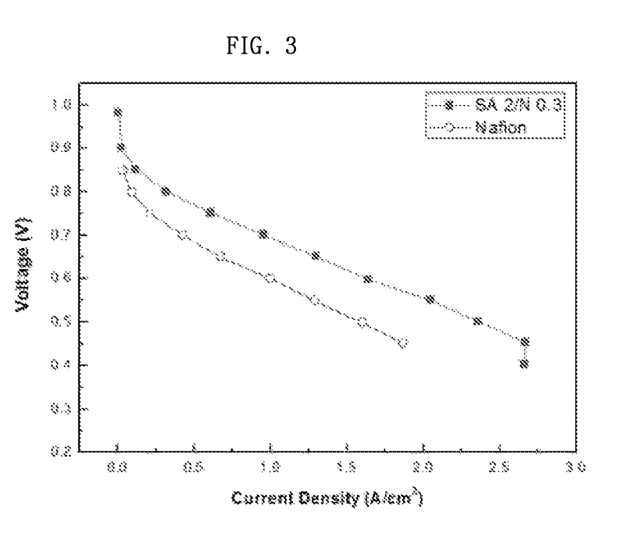
FIG. 3 shows the cell test results of the cells prepared in Example 1 and Comparison Example 1.

As shown in FIG. 3, the current density of the cell prepared by using the nanocomposite membrane in Example 1 is 1.6 A/cm$^2$, which is 1.6 times higher than the current density of the cell, 1.0 A/cm$^2$, prepared in Comparison Example 1. This is because the ion conductivity significantly increases due to easy hopping of protons via a hydrogen bonding improved by proton donor-acceptor.

The preferred embodiments of the present invention have been disclosed and illustrated. However, the invention is intended to be as broad as defined in the claims below. Those skilled in the art may be able to study the preferred embodiments and identify other ways to practice the invention that are not exactly as described in the present invention. It is the intent of the inventor(s) that variations and equivalents of the invention are within the scope of the claims below and the description, abstract and drawings not to be used to limit the scope of the invention.

INDUSTRIAL APPLICABILITY

The nanocomposite membrane of the present invention may be used for a polymer electrolyte membrane or separation membrane of a direct methanol fuel cell as well as a polymer electrolyte fuel cell.

What is claimed is:

1. A proton conductive nanocomposite membrane comprising a fluorinated proton conductive polymer substance introduced with polyhedral oligomeric silsesquioxane (POSS) having a proton donor and polyhedral oligomeric silsesquioxane (POSS) having a proton acceptor.

2. The nanocomposite membrane of claim 1, wherein the fluorinated proton conductive polymer substance comprises at a terminal thereof a functional group selected from the group consisting of sulfonic acid group, a phosphoric acid group and a carboxylic acid group.

3. The nanocomposite membrane of claim 1, wherein the nanocomposite membrane comprises from 1 wt % to 20 wt % of the polyhedral oligomeric silsesquioxane (POSS) having a proton donor and the polyhedral oligomeric silsesquioxane (POSS) having a proton acceptor.

4. The nanocomposite membrane of claim 3, wherein a weight ratio of the polyhedral oligomeric silsesquioxane (POSS) having a proton donor and the polyhedral oligomeric silse squioxane (POSS) having a proton acceptor is 1:0.05-1.

5. The nanocomposite membrane of claim 1, wherein the polyhedral oligomeric silsesquioxane (POSS) has a particle size of from 1 nm to 3 nm.

6. The nanocomposite membrane of claim 1, wherein the polyhedral oligomeric silsesquioxane (POSS) having a proton donor has the following formula 1:

[Formula 1]

where R is a proton donor, and
R is a compound having a functional group selected from the group consisting of acetic acid, nitric acid, phosphoric acid, sulfonic acid, perchloric acid, chloric acid, carbonic acid, a salt thereof, and a mixture thereof.

7. The nanocomposite membrane of claim 6, wherein R is —R1-R2, where R1 is $(CH_2)_n$ (n is an integer of 1-6) or phenylene, and R2 is acetic acid, nitric acid, phosphoric acid, sulfonic acid, perchloric acid, chloric acid, carbonic acid, a salt thereof, or a mixture thereof.

8. The nanocomposite membrane of claim 6, wherein the polyhedral oligomeric silsesquioxane (POSS) having a proton donor has the following formula 2:

[Formula 2]

where at least one R of the formula 2 is —SO$_3$H and is functionalized with up to 16 functional groups.

9. The nanocomposite membrane of claim 1, wherein the polyhedral oligomeric silsesquioxane (POSS) having a proton acceptor has the following formula 3:

[Formula 3]

where A of the formula 3 is a compound selected from the group consisting of nitrogen, oxygen, phosphorene, sulfur, fluorine, chlorine atoms having lone pair electrons.

10. The nanocomposite membrane of claim 9, wherein A is -A1A2, where A1 is $(CH_2)_n$ (n is an integer of 1-6) or phenylene, and A2 is $NH_2$, $NO_3^-$, $NH_3$, $PH_3$, $NH_2^-$, $Cl^-$, $O^{2-}$, $S^{2-}$, $F^-$, a salt thereof, or a mixture thereof.

11. The nanocomposite membrane of claim 9, wherein the polyhedral of igomeric silsesquioxane (POSS) having a proton acceptor has the following formula 4:

[Formula 4]

where at least one A is $NH_2$ and is functionalized with up to 16 functional groups.

12. A method of preparing the proton conductive nanocomposite membrane of claim 1 comprising the steps of:

mixing polyhedral oligomeric silsesquioxane (POSS) having a proton donor and polyhedral oligomeric silsesquioxane (POSS) having a proton acceptor with a fluorinated proton conductive polymer solution; and casting the mixed solution, followed by removing a solvent.

13. The method of claim 12, wherein the nanocomposite membrane comprises from 1 wt % to 20 wt % of the polyhedral oligomeric silsesquioxane (POSS) having a proton donor and the polyhedral oligomeric silsesquioxane (POSS) having a proton acceptor, and wherein a weight ratio of the polyhedral oligomeric silsesquioxane (POSS) having a proton donor and the polyhedral oligomeric silsesquioxane (POSS) having a proton acceptor is 1:0.05-1.

* * * * *